April 15, 1952 W. LLOYD 2,593,040
VEHICLE SUSPENSION MEANS
Filed Dec. 30, 1947 3 Sheets-Sheet 2

Inventor
Walter Lloyd

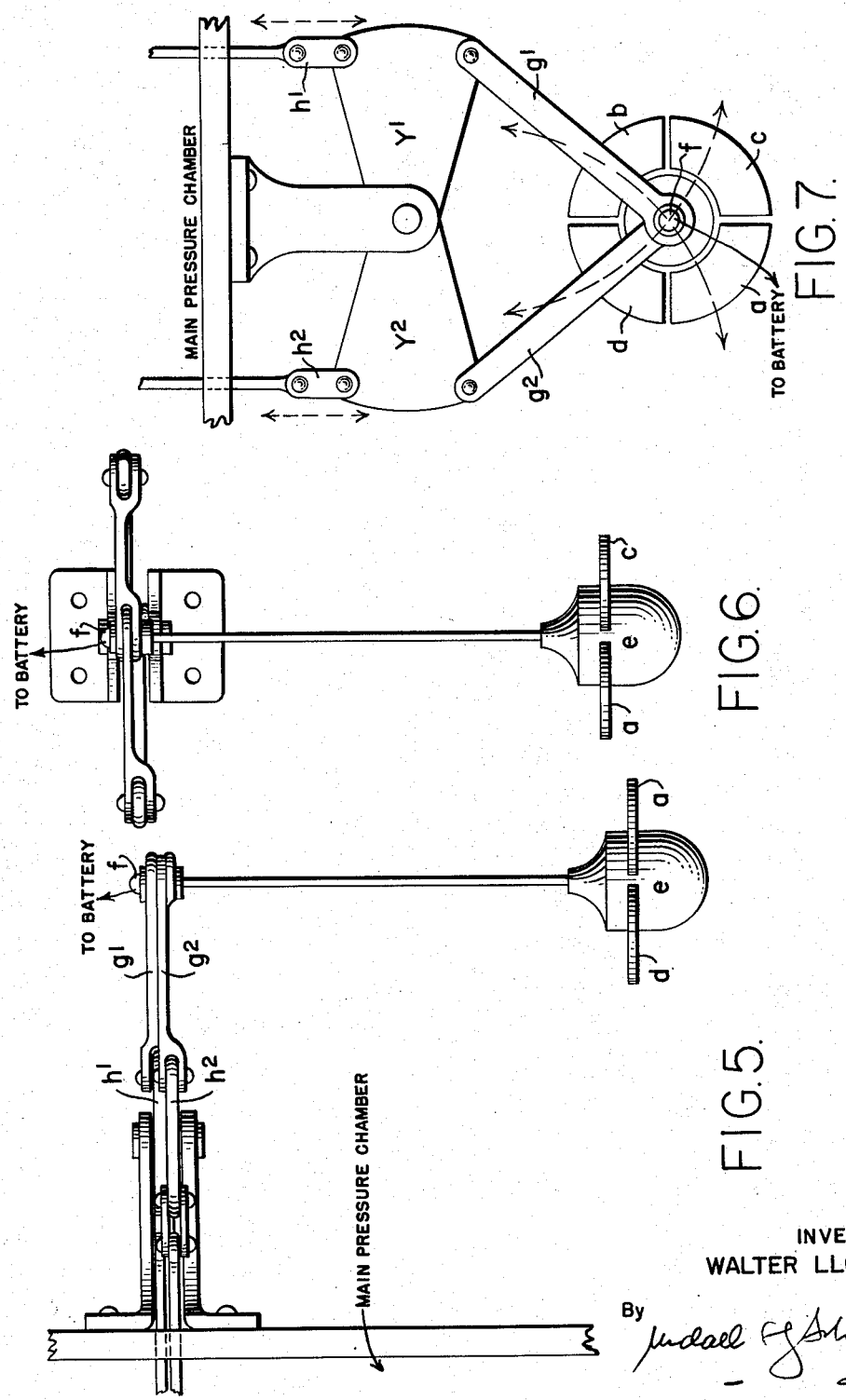

Patented Apr. 15, 1952

2,593,040

UNITED STATES PATENT OFFICE 2,593,040

VEHICLE SUSPENSION MEANS

Walter Lloyd, Northamptonshire, England

Application December 30, 1947, Serial No. 794,709
In Great Britain November 21, 1946

Section 1, Public Law 690, August 8, 1946
Patent expires November 21, 1966

11 Claims. (Cl. 280—124)

The present invention relates to vehicle suspension systems of the hydro-pneumatic type and has for its object to provide a system of this nature which will automatically maintain the vehicle in a horizontal plane notwithstanding road camber, irregular road surface, unequal loading, and the like except when the vehicle is acted upon by centrifugal and other inertia forces resulting from turning, sudden acceleration or deceleration, or the like.

The invention has moreover as a further object in the event of the above-mentioned forces coming into play to provide the requisite tilting of the vehicle in order to counteract these forces.

A still further object of the invention is to provide shock absorption.

According to the present invention vehicle suspension means of the hydro-pneumatic type comprises a series of pistons provided one in connection with each of the vehicle wheels and operating in hydraulic cylinders connected to the chassis, said hydraulic cylinders being each connected to the underside of corresponding two-diameter pistons operating in corresponding two-diameter hydraulic cylinders opening at their upper ends into a main pressure chamber common to all said two-diameter cylinders and the arrangement being such that the two-diameter pistons corresponding to diagonally opposed wheels are connected together by links pivoted at an intermediate point.

According to a further feature of the invention the links connecting the two-diameter pistons in pairs are also connected to a height control valve which according to the average height of said two-diameter pistons in their cylinders controls the flow of fluid into or from said main pressure chamber so as to ensure that said average height is maintained at a suitable level.

Tilting of the vehicle and changes in inertia or centrifugal forces acting thereon are counteracted by controlling the pressures acting on said two-diameter pistons by means of valves actuated automatically by means of a pendulum or other gravity or inertia controlled switch.

In order to allow the vehicle to maintain an inclination for sustained periods as when negotiating steep inclines, means are provided for moving the gravity or inertia controlled switch in a horizontal plane in a direction opposite to the direction of tilt whenever the incline exceeds a predetermined amount for other than momentary periods.

In the accompanying drawings illustrating one form of vehicle suspension means constructed in accordance with the present invention:

Figure 5 is a side elevation of a plumb-bob switch as used with the apparatus of the invention;

Figure 6 is an end elevation of the plumb-bob switch of Figure 5; and

Figure 7 is a top plan view of the same plumb-bob switch.

Figure 1:
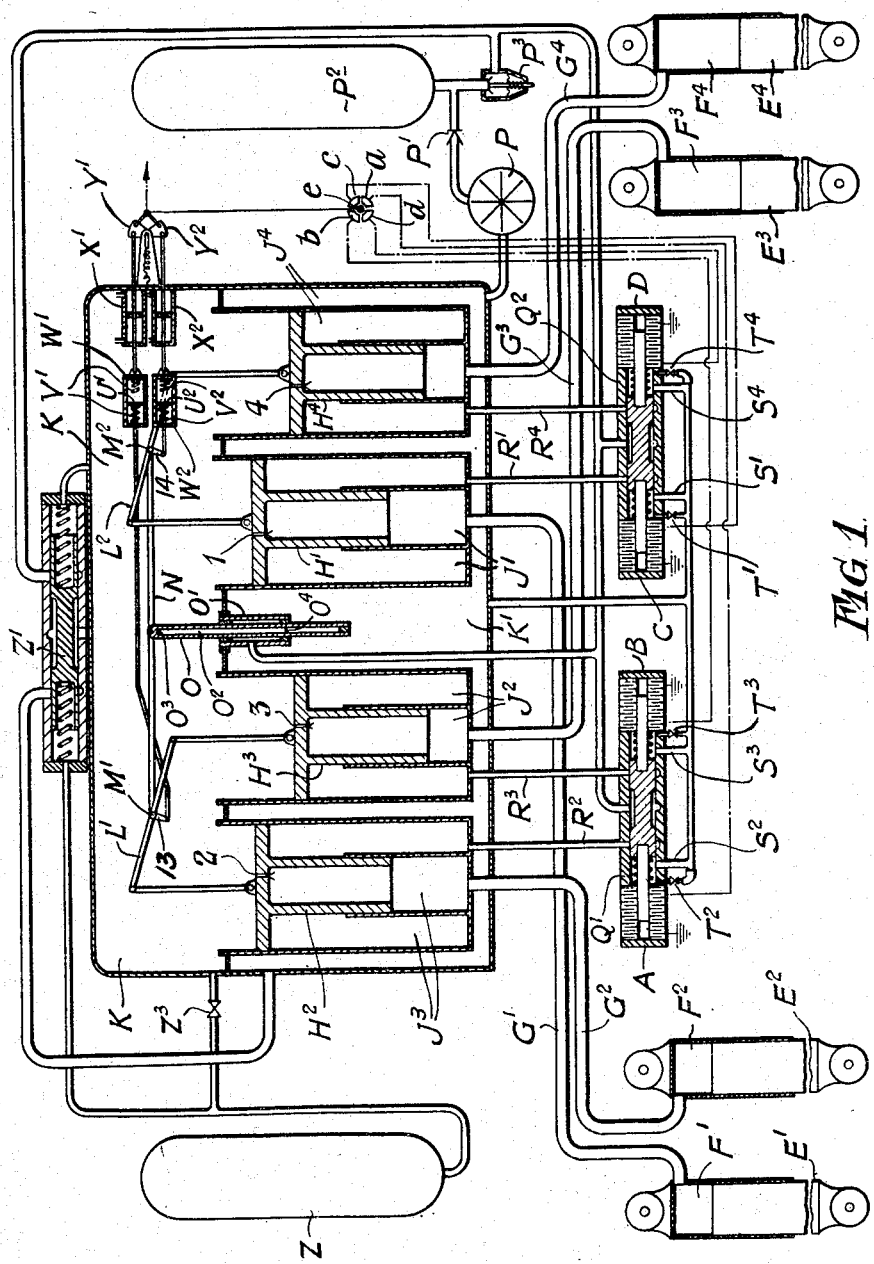
Figure 1 is a diagrammatic representation of a vehicle suspension means as provided in connection with the wheels of a four-wheeled vehicle.

In the form of the invention shown in Figure 1 of the drawings a hydro-pneumatic suspension means for a four-wheeled vehicle comprises pistons $E^1$, $E^2$, $E^3$, $E^4$ connected one to each of the vehicle wheels and operating in hydraulic cylinders $F^1$, $F^2$, $F^3$, $F^4$ mounted on the vehicle chassis. Said hydraulic cylinders are connected by pipes $G^1$, $G^2$, $G^3$, $G^4$ to the undersides of corresponding two-diameter pistons $H^1$, $H^2$, $H^3$, $H^4$ operating in similar two-diameter cylinders $J^1$, $J^2$, $J^3$, $J^4$ the upper ends of which open into a main pressure chamber K common to all four cylinders.

The pistons $E^1$ and $E^2$ correspond to the right-hand and left-hand rear wheels of the vehicle respectively, while the other two pistons $E^3$ and $E^4$ are connected respectively to the right-hand and left-hand front wheels. The two-diameter pistons corresponding to diagonally opposite wheels on the vehicle are linked together namely that corresponding to the right-hand rear wheel is linked to that connected with the left-hand front wheel and that corresponding to the left-hand rear wheel is linked to that corresponding to the right-hand front wheel. Thus the two-diameter pistons $H^2$ and $H^3$ are connected together by a link $L^1$ pivoted intermediately at $M^1$ while the two-diameter pistons $H^1$ and $H^4$ are connected together by a link $L^2$ pivoted at $M^2$. The pivotal points $M^1$ and $M^2$ of the links $L^1$ and $L^2$ are also connected together by a further link N which carries a height control valve O controlling the admission of fluid to or its release from the main pressure chamber K.

Said valve O comprises a tubular member sliding through a recessed guide $O^1$ and having its bore $O^2$ communicating with openings $O^3$, $O^4$ which afford communication between said main pressure chamber K and either a sump $K^1$ connected through a pump P and non-return valve $P^1$ to a high pressure chamber $P^2$, or direct to high-pressure chamber $P^2$. This high pressure chamber is charged with air up to a predetermined pressure before pumping fluid into it and the outlet from said chamber $P^2$ is controlled by a balance pressure-retaining valve $P^3$ which closes the outlet should the pressure fall below this predetermined amount. It will be seen that as the valve O rises and falls it controls the admission of compressed air or fluid to or its release from the main pressure chamber K so as to ensure that the two-diameter pistons are maintained at a suitable level.

Stabilization of the vehicle is automatically effected by means of a gravity or inertia controlled switch $e$ resembling a plumbline bob and adapted to move between four quadrantal electric contacts $a, b, c, d$ connected in circuit respectively to a series of solenoids A, B, C, D controlling a pair of valves $Q^1$, $Q^2$. Electric current is supplied to the solenoids according to the contacts which are brought into action by a battery connected to the switch $e$ the point of suspension of which is insulated from the chassis.

Tilting of the vehicle causes the switch bob $e$ to come against one or more of the contacts $a, b, c, d$ which energizes the appropriate solenoids A, B, C, D to cause an operation of the valves $Q^1$, $Q^2$ which by means of connections $R^1$, $R^2$, $R^3$, $R^4$ controls the pressure underneath the two-diameter pistons $H^1$, $H^2$, $H^3$, $H^4$ so as to cause these to rise or fall as will be necessary to counteract the tilt of the vehicle.

When such tilt of the vehicle is evident towards the left-hand front wheel, switch bob $e$ will thereby be brought against the quadrantal contact $c$ completing the circuit from the battery, through the bob $e$, contact $c$, and solenoid C. This causes the piston valve $Q^2$ to be attracted by the solenoid C thereby opening the connection $R^4$ and releasing the pressure existing underneath the larger diameter of the piston $H^4$ so that said piston descends. At the same time the connection $S^1$ leading from the valve $Q^2$ to the sump $K^1$ is closed while the connection $R^1$ is put in communication with the high-pressure chamber $P^2$ by a recess in the valve $Q^2$. This allows fluid at high pressure to flow to the underside of the larger diameter of the piston $H^1$ thereby raising said piston and lowering the chassis over the associated road wheel. Since the pressure has been released from underneath the larger diameter of the piston $H^4$ the chassis is correspondingly lifted over the associated road wheel namely the near-side front wheel.

When the true vertical position for the switch bob $e$ is achieved the same breaks contact so as to de-energize the solenoid C and allow the valve $Q^2$ to return under the action of its return spring. The movements of the valves $Q^1$ and $Q^2$ are slowed down by the action of flow-restricting valves $T^1$, $T^2$, $T^3$, $T^4$ during the later part of their travel in order that the pressure may be released from one cylinder before high-pressure is admitted to the other thereby reducing a possible tendency for the vehicle to oscillate.

Similarly any sudden change of speed or direction of the vehicle will cause the plumb-bob $e$ to move under the action of momentum, inertia, or centrifugal force so as to touch the appropriate contacts according to the direction of the force and thus cause a counteraction in one or both pairs of the appropriate pressure control cylinders.

In order to allow the vehicle to traverse steep gradients say of 1 in 5 a device is incorporated in the system which has the effect of limiting the amount of correction given on a steep incline whilst retaining freedom of correction for momentary variations due to sudden braking, accelerating, turning or the like. This device consists of means for moving the point of suspension of the plumb-bob $e$ in a horizontal plane in a direction opposite to the direction of tilt when on an incline whenever the gradient exceeds a predetermined amount for more than momentary periods.

To achieve this object arms 13, 14 connected to the pivotal centres $M^1$, $M^2$ of the links $L^1$, $L^2$ are used to operate a pair of plungers $U^1$, $U^2$ which press against light springs $V^1$, $V^2$ whenever the predetermined distance of movement is exceeded. Pressure upon these springs causes movement of the cylinders $W^1$, $W^2$ which are coupled through a pair of dash-pots $X^1$, $X^2$ to a pair of quadrants $Y^1$, $Y^2$ connected to the suspension point of the plumb-bob $e$. The quadrants convert the longitudinal movements of the cylinders $W^1$, $W^2$ into diagonal ones which are so arranged that the diagonals coincide with the position of the associated road wheels. Light springs may be used to return the quadrants to normal. The dash-pots $X^1$, $X^2$ prevent momentary variations in the movement of the vehicle from actuating the quadrants $Y^1$, $Y^2$ while allowing sustained alterations to do so.

Regarding Figure 1, and Figures 5, 6 and 7, it is to be noted that, as already intimated, piston $E^1$ is connected to the right-hand rear wheel, $E^2$ to the left-hand rear road wheel, $E^3$ to the right-hand front wheel, and $E^4$ to the left-hand front wheel, as viewed by a person sitting in the vehicle and facing forward.

Assuming a tendency for the vehicle to tilt towards the left front wheel, this will immediately cause the moving contact $e$ of the plumb-bob switch to touch the fixed contact $c$ completing the battery circuit and energizing the solenoid C of the valve $Q^2$ thereby attracting the piston of this valve and allowing the pressure on the underside of the larger diameter of the piston $H^4$ to be released via the cylinder $J^4$, communication $R^4$, valve $Q^2$, communication $S^4$ to sump $K^1$, thus causing the effective downward pressure on the double diameter piston $H^4$ to be increased and, since this piston is in hydraulic communication with the road wheel piston $E^4$, the pressure upon this latter piston will likewise be increased. At the same time, the piston of valve $Q^2$ will have uncovered the communication from the larger diameter cylinder $J^1$ thereby allowing pressure from the reservoir $P^2$ to be applied to the underside of the larger diameter of the piston $H^1$ thus decreasing the effective downward pressure on this piston and hence on the right rear wheel piston $E^1$. The alteration in pressure on these two road wheel pistons counterbalances the tendency of the vehicle to tilt towards the left front wheel and allows the moving contact of the plumb-bob switch to swing clear of the fixed contact c, breaking the solenoid circuit and allowing the piston of the valve $Q^2$ to return to normal under the action of the return springs. Similarly, if the tendency should be a rearwards tilt the plumb-bob contact will touch both contacts b and d, energizing solenoids B and D of the valves $Q^1$ and $Q^2$ thereby increasing the downward pressure on pistons $H^1$ and $H^2$ and decreasing the downward pressure on pistons $H^3$ and $H^4$ similarly increasing the pressure on rear wheel pistons $E^1$ and $E^2$ and decreasing the pressure on the front wheel pistons $E^3$ and $E^4$, counterbalancing the rearward tilt tendency until the plumb-bob switch breaks the solenoid circuit and allows the pistons of valves $Q^1$ and $Q^2$ to return to normal.

The invention further provides for shock absorbing requirements. This is obtained by means of a differential pressure chamber Z and a valve $Z^1$, said differential chamber being connected to the main pressure chamber K through a flow-restricting valve $Z^3$. This permits the pressures in the two chambers K and Z to equalize normally, but the sudden rise or fall of one or more of the two-diameter pistons $H^1$, $H^2$, $H^3$, $H^4$ will cause a corresponding sudden rise or fall of pressure in the main pressure chamber K which because of the restricted flow between the two chambers will momentarily produce a difference in pressure between them. This is utilized to operate the piston valve $Z^1$ which is acted upon by the pressures in the two chambers by means of the passages shown in Figure 1 so as to admit or release fluid under pressure according to the pressure difference. The ports of the valve $Z^1$ are large in comparison with those of the height-control valve O and thus temporarily override this when in action.

Specifically, the function of valve $Z^1$ is to release pressure from the main pressure chamber to the sump in the event of the pressure in this chamber suddenly rising, due to the transmission of a road shock to one or more of the pistons $H^1$, $H^2$, $H^3$ and $H^4$, causing one or more of these pistons to rise in their respective cylinders or, alternatively, admitting pressure from the reservoir to the main pressure chamber in the event of a sudden decrease of pressure in the main pressure chamber due to a road shock causing one or more of the pistons to fall.

This action is achieved by connecting a differential pressure chamber to the main pressure chamber by means of a flow restricting valve $Z^3$. Normally, the pressures in these two chambers are equal, but, due to the presence of this flow restricting valve, a sudden change of pressure in the main pressure chamber will produce a temporary difference of pressure between the two chambers.

A communication is provided from the differential pressure chamber to one end of the differential pressure valve $Z^1$, a communication is also provided from the main pressure chamber to the other end of the differential pressure valve. Consequently, any difference in pressure between the two chambers produces a difference of pressure across the ends of the normally centralized piston of valve $Z^1$, causing it to move along its cylinder, and in so doing, uncover ports to provide communication between the sump and the main pressure chamber or alternatively, between the reservoir and the main pressure chamber to counteract the conditions existing in the main pressure chamber at the moment, the piston of the valve returning to normal under the action of springs as soon as the pressures in the two chambers become equal.

Means for maintaining the amount of fluid in the parts of the system enclosed between the road-wheel pistons and the two-diameter pistons may be provided by the insertion of a small non-return valve 1, 2, 3, 4 at the top of each of the pistons $H^1$, $H^2$, $H^3$, $H^4$ so as to connect the smaller diameter cylinders to the main pressure chamber K. By-pass valves may also be provided to release the pressure in the lower compartments of the cylinders $J^1$, $J^2$, $J^3$, $J^4$ so that upon jacking up the chassis with the wheels suspended clear of the ground the road-wheel cylinders and pistons are fully extended whilst the two-diameter pistons will be pulled down to their lower limit. Any shortage of fluid in the system will tend to cause a vacuum which will open the non-return valve and admit fluid from the main pressure chamber until the deficiency is made good.

Referring now more particularly to the plumb-bob switch as shown in detail in Figures 5, 6 and 7, it may be noted that the switch itself consists of the contact e free to move in an area circumscribed by four arc-shaped contacts, a, b, c and d. This contact e is suspended from a point f by means of a flexible conductor which may be a flexible wire and therefor acts like a plumb-bob within the limits of the circle formed by the inner diameter of the fixed contacts a, b, c and d. The alignment of this plumb-bob and the four fixed contacts is such that when the chassis is truly horizontal the contact e is centralized in the middle of the fixed contacts and tilting of the chassis will cause the suspended bob e to make contact with one or more of the fixed contacts a, b, c and d, according to the direction of the tilt, this then completes the electrical circuit to one or more of the solenoids which operate valves $Q^1$ and $Q^2$ thereby admitting or releasing pressure in the larger diameter cylinders $J^1$, $J^2$, $J^3$ and $J^4$, depending upon the amount of correction required, thus causing an alteration in the effective pressures acting upon the pistons $H^1$, $H^2$, $H^3$ and $H^4$ with a corresponding movement of these pistons which is transmitted to the road-wheel cylinders, and thus raising or lowering the chassis as required to restore the equilibrium and the contact e swings free again, breaking the solenoid circuit. In order to keep the horizontal control within practical bounds, a means is provided whereby the vehicle is allowed to tilt at a steady and proportionate angle whenever an incline on which the vehicle may be exceeds a predetermined degree. By means of various linkages (shown in Figure 1 of the drawing) the relative movements of the double diameter pistons $H^2$, $H^3$ and $H^1$, $H^4$, if beyond a predetermined amount, are finally conveyed to two quadrants, $Y^1$ and $Y^2$, by two links, $h^1$ and $h^2$. Two further linkages, $g^1$ and $g^2$, connect the quadrants to a common point which is the suspension point f of the plumb-bob switch. Thus, longitudinal movements of the link $h^1$, assuming that the vehicle suspension device is mounted longitudinally on the chassis, will cause the suspension point f to be moved along a line prescribed by an arc the radius of which is the link $g^2$. Since these longitudinal movements will be small compared to the length of the linkages $g^1$ and $g^2$ the movement of the point f will, to all practical intents, be diagonal. Similarly, longitudinal movements of $h^2$ will cause the point $f$ to move along an arc generated by the link $g^1$. If both the links $h^1$ and $h^2$ are caused to be operated then the movement of the suspension point $f$ will be the resultant of the forces exerted by the two links $g^1$ and $g^2$. Two return springs (not shown) may be used to return the suspension point to normal when the compensating device is not in action.

Figure 2:
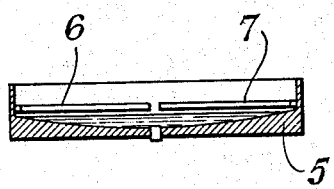
Figures 2 and 3 are a sectional elevation and plan respectively of a modified form of controlling switch.
Figure 3:
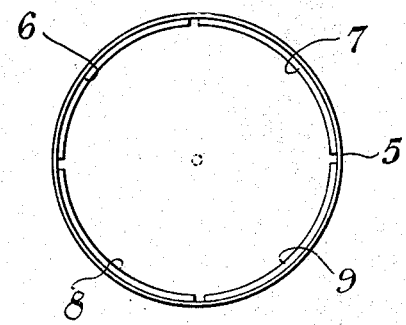

In the modified form of controlling switch shown in Figures 2 and 3 the plumb-bob is replaced by a mercury switch comprising a dished member or vessel 5 containing mercury or like electrically conducting liquid and having four contacts 6, 7, 8, 9 arranged around said vessel so that the liquid contacts with one or other of these according to the movement to counteracted.

Figure 4:
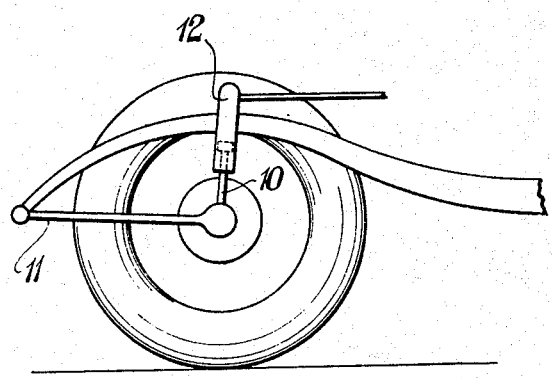
Figure 4 is a side view of the suspension of a vehicle wheel.

Figure 4 shows the arrangement of the piston and cylinder in connection with one of the road wheels. The piston 10 is connected to the wheel axle or brake-drum backplate and a suitable pivoted arm 11 is provided to maintain alignment and to take up torque stresses and the like. The hydraulic cylinder 12 in which the piston 10 operates is connected to an appropriate point on the chassis.

Whilst in this embodiment mercury switches have been described other suitable types of switches may be used, for example the plumb-bob or pendulum type of switch.

What I claim is:

1. Vehicle suspension means of the hydropneumatic type comprising in combination, a first set of hydraulic cylinders connected to the chassis of the vehicle; a first set of pistons operating in said hydraulic cylinders, one piston for each wheel of the vehicle and being connected thereto; a second set of two diameter hydraulic cylinders; a second set of two diameter pistons, one operating in each of said second cylinders; means providing a communication between each of said cylinders of said first set and the underside of a corresponding piston of said second set of pistons in said second set of cylinders; walls forming a main pressure chamber, the said main pressure chamber being common to all of said second cylinders and being in communication with the upper ends of larger diameter of the latter; and pairs of linkages communicating together pairs of said second pistons corresponding to diagonally opposite wheels.

2. Vehicle suspension means of the hydropneumatic type comprising in combination, a first set of hydraulic cylinders connected to the chassis of the vehicle; a first set of pistons operating in said hydraulic cylinders, one piston for each wheel of the vehicle and being connected thereto; a second set of two diameter hydraulic cylinders; a second set of two diameter pistons, one operating in each of said second cylinders; means providing a communication between each of said cylinders of said first set and the underside of a corresponding piston of said second set of pistons in said second set of cylinders; walls forming a main pressure chamber, the said main pressure chamber being common to all of said second cylinders and being in communication with the upper ends of larger diameter of the latter; pairs of link means connecting together pairs of said second pistons corresponding to diagonally opposite wheels; and further link means supporting each of said pairs of link means at one intermediate point thereof.

3. Vehicle suspension means of the hydropneumatic type comprising in combination, a first set of hydraulic cylinders connected to the chassis of the vehicle; a first set of pistons operating in said hydraulic cylinders, one piston for each wheel of the vehicle and being connected thereto; a second set of hydraulic cylinders, the latter cylinders being double walled so as to provide a large and a small diameter; a second set of pistons, one for each of said second cylinders the latter pistons being formed with a large and a small diameter portion and being engaged by said large and small diameters of said second set of cylinders; a communication between each of said cylinders of said first set of cylinders and the narrow diameter at the underside of a corresponding piston of said second set of pistons; walls forming a main pressure chamber, the said main pressure chamber being common to all of said second cylinders and being in communication with the upper ends of the latter and thus with the large diameter of said second pistons at the upper face thereof; and pairs of link means connecting together pairs of said second pistons corresponding to diagonally opposite wheels; and further link means supporting each of said pairs of link means at one intermediate point thereof said further link means being pivoted at an intermediate point thereof to valve means in communication with said pressure chamber.

4. Vehicle suspension means of the hydropneumatic type comprising in combination, a first set of hydraulic cylinders connected to the chassis of the vehicle; a first set of pistons operating in said hydraulic cylinders, one piston for each wheel of the vehicle and being connected thereto; a second set of two diameter hydraulic cylinders; a second set of two diameter pistons, one operating in each of said second cylinders; means providing a communication between each of said cylinders of said first set and the underside of a corresponding piston of said second set of pistons in said second set of cylinders; walls forming a main pressure chamber, the said main pressure chamber being common to all of said second cylinders and being in communication with the upper ends of the latter; pairs of linkages connecting together pairs of said second pistons corresponding to diagonally opposite wheels; a sump; a reservoir containing a fluid under pressure; a pump for pumping fluid from said sump to said reservoir; ducts providing communication from said main pressure chamber to said sump and reservoir; and valve means for alternatively opening and closing said communication from said pressure chamber to said sump or to said reservoir, the said valve means being controlled by the movements of said linkages.

5. Vehicle suspension means of the hydropneumatic type comprising in combination, a first set of hydraulic cylinders connected to the chassis of the vehicle; a first set of pistons operating in said hydraulic cylinders, one piston for each wheel of the vehicle and being connected thereto; a second set of two diameter hydraulic cylinders; a second set of two diameter pistons, one operating in each of said second cylinders; means providing a communication between each of said cylinders of said first set and the underside of a corresponding piston of said second set of pistons in said second set of cylinders; walls forming a main pressure chamber, the said main pressure chamber being common to all of said second cylinders and being in communication with the upper ends of the latter; pairs of link means connecting together pairs of said second pistons corresponding to diagonally opposite wheels; further link means supporting each of said pairs of link means at one intermediate point thereof; a sump; a reservoir containing a fluid under pressure; a pump for pumping fluid from said sump to said reservoir; ducts providing communication from said main pressure chamber to said sump and reservoir; valve means for alternatively opening and closing said communication from said pressure chamber to said sump or to said reservoir; and actuating means for said valve means, the said actuating means being connected to said pairs of link means so as to be controlled by the movement of the latter.

6. Vehicle suspension means of the hydropneumatic type comprising in combination, a first set of hydraulic cylinders connected to the chassis of the vehicle; a first set of pistons operating in said hydraulic cylinders, one piston for each wheel of the vehicle and being connected thereto; a second set of hydraulic cylinders, the latter cylinders being double walled so as to provide a large and a small diameter; a second set of pistons, one for each of said second cylinders, the latter pistons being formed with a large and a small diameter and being engaged by said large and small diameters of said second set of cylinders; a communication between each of said cylinders of said first set of cylinders and the narrow diameter at the underside of a corresponding piston of said second set of pistons; walls forming a main pressure chamber, the said main pressure chamber being common to all of said second cylinders and being in communication with the upper ends of the latter and thus with the large diameter of said second pistons at the upper face thereof; pairs of link means connecting together pairs of said second pistons corresponding to diagonally opposite wheels; further link means supporting each of said pairs of link means at one intermediate point thereof; a sump; a reservoir containing a fluid under pressure; a pump for pumping fluid from said sump to said reservoir; separate duct means providing communications between the major diameter of each of said second pistons and said sump; valve means for alternatively opening and closing the communication of selected pistons of said second set to said sump or to said reservoir; electromagnetic means for actuating said valve means so that the said selected second pistons corresponding to diagonally opposite wheels are in communication, one with the said sump and the other with said reservoir whereby pressure is released or increased on said latter pistons; stationary contact means for said electromagnetic means; and gravity controlled switch means for engagement of selected ones of said stationary contact means.

7. Vehicle suspension means of the hydropneumatic type comprising in combination, a first set of hydraulic cylinders connected to the chassis of the vehicle; a first set of pistons operating in said hydraulic cylinders, one piston for each wheel of the vehicle and being connected thereto; a second set of hydraulic cylinders, the latter cylinders being double walled so as to provide a large and a small diameter; a second set of pistons, one for each of said second cylinders, the latter pistons being formed with a large and a small diameter and being engaged by said large and small diameters of said second set of cylinders; a communication between each of said cylinders of said first set of cylinders and the narrow diameter at the underside of a corresponding piston of said second set of pistons; walls forming a main pressure chamber, the said main pressure chamber being common to all of said second cylinders and being in communication with the upper ends of the latter and thus with the large diameter of said second pistons at the upper face thereof; pairs of link means connecting together pairs of said second pistons corresponding to diagonally opposite wheels; further link means of said pairs of link means at one intermediate point thereof; a sump; a reservoir containing a fluid under pressure; a pump for pumping fluid from said sump to said reservoir; separate duct means providing communications between the major diameter of each of said second pistons and said sump; valve means for alternatively opening and closing the communication of selected pistons of said second set to said sump or to said reservoir; electromagnetic means for actuating said valve means so that the said selected second pistons corresponding to diagonally opposite wheels are in communication, one with the said sump and the other with said reservoir whereby pressure is released or increased on said latter pistons; stationary contact means for said electromagnetic means; and inertia controlled switch means for engagement of selected ones of said stationary contact means.

8. Vehicle suspension means constructed in accordance with claim 6, wherein said switch member is a freely suspended pendulum bob and wherein said stationary contact means are arranged circumferentially around said bob.

9. Vehicle suspension means constructed in accordance with claim 6, wherein said switch member comprises a dished vessel containing mercury and wherein the said stationary contact means are arranged around said vessel in star manner.

10. Vehicle suspension means constructed in accordance with claim 6, wherein said switch member is a freely suspended pendulum bob and wherein said stationary contact means are arranged circumferentially around said bob; and wherein link means operatively connected to said piston connecting link means are provided for adjusting the point of suspension of said pendulum bob so as to allow the vehicle to negotiate gradients.

11. Vehicle suspension means of the hydropneumatic type comprising in combination, a first set of hydraulic cylinders connected to the chassis of the vehicle; a first set of pistons operating in said hydraulic cylinders, one piston for each wheel of the vehicle and being connected thereto; a second set of two diameter hydraulic cylinders; a second set of two diameter pistons, one operating in each of said second cylinders; means providing a communication between each of said cylinders of said first set and the underside of a corresponding piston of said second set of pistons in said second set of cylinders; walls forming a main pressure chamber, the said main pressure chamber being common to all of said second cylinders and being in communication with the upper ends of the latter; a sump, a reservoir containing a fluid under pressure, a pump for pumping fluid from said sump to said reservoir; ducts providing communication from said main pressure chamber to said sump and reservoir; a differential pressure chamber, means of communication between said differential pressure chamber and said main pressure chamber; valve means for restricting the flow of fluid between said main pressure chamber and said differential pressure chamber; a differential pressure operated valve, communication means between said differential pressure chamber and said valve for operating said valve in one direction; communication means between said main pressure chamber and said valve for operating said valve in the other direction; duct means providing communication from said main pressure chamber, from said reservoir, and from said sump respectively to said differential valve whereby when said valve is operated in said one direction, said reservoir is in communication with said main pressure chamber and when said valve is operated in said other direction said sump is in communication with said main pressure chamber.

W. LLOYD.

REFERENCES CITED

The following references are of record in the file of this patent:

UNITED STATES PATENTS

| Number | Name | Date |
|---|---|---|
| 2,353,503 | Rost et al. | July 11, 1944 |